US006470342B1

United States Patent
Gondi et al.

(10) Patent No.: US 6,470,342 B1
(45) Date of Patent: Oct. 22, 2002

(54) PROCESS OF MAINTAINING A DISTRIBUTED MAP OF TRANSACTION IDENTIFIERS AND USING HASHING TO ACCESS THESE MAPS

(75) Inventors: Albert C. Gondi, Santa Clara;
Johannes Klein, San Francisco;
Sitaram V. Lanka, Mercer Island;
Roger J. Hansen, San Francisco;
Sameer Joshi, San Jose, all of CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/267,422

(22) Filed: Mar. 12, 1999

(51) Int. Cl.[7] .................... G06F 17/30; G06F 15/16; G06F 11/30

(52) U.S. Cl. .................. 707/10; 709/229; 709/219; 713/201

(58) Field of Search .................. 370/254; 709/203, 709/201, 219, 222, 229, 204–205; 714/19–20; 713/201, 153, 168; 707/10, 104.1, 203–204

(56) References Cited

U.S. PATENT DOCUMENTS

| | | | |
|---|---|---|---|
| 4,228,496 A | 10/1980 | Katzman et al. | 364/200 |
| 4,817,091 A | 3/1989 | Katzman et al. | 371/9 |
| 5,319,774 A * | 6/1994 | Ainsworth et al. | 714/20 |
| 5,327,532 A | 7/1994 | Ainsworth et al. | 395/200 |
| 5,504,899 A | 4/1996 | Raz | 395/650 |
| 5,504,900 A | 4/1996 | Raz | 395/650 |
| 5,680,610 A | 10/1997 | Smith et al. | 395/610 |
| 5,701,480 A | 12/1997 | Raz | 395/671 |
| 5,751,932 A | 5/1998 | Horst et al. | 395/182.1 |
| 5,835,766 A | 11/1998 | Iba et al. | 395/679 |
| 5,920,863 A | 7/1999 | McKeehan et al. | 707/10 |
| 5,923,833 A * | 7/1999 | Freaund et al. | 714/19 |
| 5,926,463 A * | 7/1999 | Ahearn et al. | 370/254 |
| 6,101,527 A | 8/2000 | Lejeune et al. | 709/201 |
| 6,105,147 A | 8/2000 | Molloy | 714/16 |
| 6,115,711 A | 9/2000 | White | 707/10 |
| 6,173,313 B1 * | 1/2001 | Klots et al. | 709/203 |
| 6,205,464 B1 * | 3/2001 | Cobb et al. | 709/101 |
| 6,209,038 B1 | 3/2001 | Bowen et al. | 709/238 |
| 6,266,698 B1 | 7/2001 | Klein et al. | 709/227 |
| 6,295,548 B1 | 9/2001 | Klein et al. | 709/101 |

OTHER PUBLICATIONS

Jim Gray, et al.; Transaction Processing: Concepts and Technique; Morgan Kauffman; 1993; pp. v–xxxii.

* cited by examiner

Primary Examiner—Thomas Black
Assistant Examiner—Te Yu Chen
(74) Attorney, Agent, or Firm—Leah Sherry; Oppenheimer, Wolff & Donnelly (57) ABSTRACT

Systems and methods for supporting and maintaining a distributed global map of transaction identifiers at the gateway processes using a hashing algorithm configured on each application process to access the global maps. A global map of transaction identifiers that associates global transaction identifiers with remote local transaction identifiers is maintained at each gateway process. When an application process performing work for a particular transaction desires to export the transaction to a remote node, a hashing function configured on the application process is applied to the global transaction identifier associated with the particular transaction. Application of the hashing function to the global transaction identifier identifies one of the gateway processes. The global transaction identifier is stored to the global map associated with that gateway process. When the remote transaction manager associated with the remote node responds with a local transaction identifier for a local transaction initiated at the remote node, the local transaction identifier is stored to the identified gateway's global map in association with the global transaction identifier. Each application process is configured with the same hashing function so that the same gateway process will always be identified given a particular global transaction identifier. If the same or another application process desires to export to a remote node a transaction that has already been exported, the hashing function on that application process identifies the same gateway through which the transaction was originally exported.

37 Claims, 5 Drawing Sheets

FIG. 1

Components of a Heterogeneous Transaction Processing System

PROCESS OF MAINTAINING A DISTRIBUTED MAP OF TRANSACTION IDENTIFIERS AND USING HASHING TO ACCESS THESE MAPS

CROSS REFERENCE TO RELATED APPLICATIONS

This Application is related to of U.S. applications Ser. No.: 09/267,032, 09/267,460, 09/267,844 filed Mar. 11, 1999, Mar. 12, 1999, and Mar. 12, 1999, respectively.

COPYRIGHT NOTICE

A portion of the disclosure of this patent document, referred to as "Appendix A", contains material, titled "Transaction Internet Protocol, Version 3.0," which is subject to copyright protection. The copyright owner has no objection to the xerographic reproduction by anyone of the patent document or the patent disclosure in the exactly the form it appears in the Patent and Trademark Office patent file or records, but otherwise reserves all copyright rights whatsoever.

BACKGROUND OF THE INVENTION

The present invention relates generally to transaction processing, and more particularly to techniques for supporting and maintaining a distributed global map of transaction identifiers at the gateway processes and using a hashing algorithm to access these maps.

A transaction is most often defined as an explicitly delimited operation, or set of related operations, that change or otherwise modify the content of an information collection (e.g., database or databases) from one consistent state to another. Changes are treated as a single unit in that all changes of a transaction are formed and made permanent (the transaction is "committed") or none of the changes are made permanent (the transaction is "aborted"). If a failure occurs during the execution of a transaction, resulting in the transaction being aborted, whatever partial changes were made to the collection arc undone to leave it in a consistent state.

A transaction processing system typically includes a transaction manager; a collection of subsystems, called resource managers (RMs), which are essentially abstractions of available services, such as database systems; application programs; and the like. The transaction processing system provides a way to interconnect applications and resource managers while maintaining data integrity and transactional consistency.

The application process initiating a transaction invokes various services and/or resource managers to perform various operations and tasks necessary to complete the transaction. All services and resource managers invoked to perform operations for the transaction register with a transaction manager, stating that they are joining the transaction. A transaction manager typically provides transaction management functions, such as monitoring the progress of the transaction and coordinating the commit processing and rollback of the transaction, and protects the integrity of user data. When all operations, or work, have completed, the initiating application process notifies the transaction manager of this fact. The transaction manager then initiates an agreement protocol to coordinate commitment processing among all services and resource managers (including foreign transaction managers) participating in the transaction. In transaction processing the standard agreement protocol is the two-phase commitment (2PC) protocol. A description of the 2PC protocol, as well as a detailed overview of transaction processing, is presented in J. Gray et al., *Transaction Processing Concepts and Techniques*, Morgan Kauffman, 1993, the contents of which are herein incorporated by reference.

Briefly, in phase one of the 2PC protocol, the transaction manager issues a request prepare signal to each participant (i.e., the transaction manager asks each participating service or resource manager if it believes the operations it performed to be a consistent and complete transformation). If any participant votes no, the commit fails and the transaction is aborted and rolled back; if all participating resource managers vote yes (ready to commit), the transaction is a correct transformation and phase two commences. In phase two of the 2PC protocol, the transaction manager issues a commit request signal informing each participant that the transaction is complete, and records this fact in the transaction's log. After all participants acknowledge the commit request, the transaction manager records this fact and forgets about the transaction.

Recently, a Transaction Internet Protocol (TIP) that uses the 2PC paradigm has been proposed by the Internet Engineering Task Force (IETF). Attached hereto, as Appendix A, is the final version of the IETF paper describing TIP and its requirements. The IETF paper describes a simple 2PC protocol applicable to transactions involving resources in a distributed, Internet-connected transaction. Basically, two models are described: a "Push" model and "Pull" model.

In the Push model, an application on a first transaction processing system requests that the transaction manager of that system "export" a transaction, T1, to a second transaction monitoring system to perform some work on behalf of the application. The transaction manager of the first system "pushes" transaction T1 to the second system by sending a message to the transaction manager of the second system. The message requests that the second system start a local transaction associated with transaction T1 as a subordinate of the first system, and return the name, for example "LT1", for that local transaction branch on the second system together with the Internet address of the local transaction branch. The transaction manager forwards to the application the name, LT1, and the internet address of the transaction on the second system associated with transaction T1. The application then sends a message to the desired application on the second system, asking it to "do some work, and make it part of the transaction that your transaction manager already knows of by the name of LT1." Additionally, the first and second transaction managers each update their own global map by associating the global transaction T1 initiated on the first system with the exported transaction branch LT1. The global map is a data structure that each transaction manager maintains in order to associate any and all remote transaction branches, such as LT1, with associated global transactions, such as T1. Because the first system's transaction manager knows that it sent the transaction to the second system's transaction manager, the first system's transaction manager knows to involve the second system's transaction manager in the 2PC process.

In the Pull model, an application on the first system merely sends a message to an application on the second system, requesting that it "do some work, and make it part of a transaction that my transaction manager knows by the name of T1." The application on the second system then requests that its transaction manager enlist in the transaction T1. The second system's transaction manager "pulls" transaction T1 over from the first system and then initiates a local transaction, LT1, associated with transaction T1. Also, both transaction managers update their global maps. As a result of the pull, the first system's transaction manager knows to involve the second system's transaction manager in the 2PC process.

In both the Push model and the Pull model, an application on the first system communicates with the second system via a gateway process. In some cases where there is only one gateway process associated with the transaction manager, many applications resident on the transaction system may attempt to communicate with other systems through the single gateway process. This may result in a bottleneck at the gateway, thereby degrading system performance. It is thus desirable to include multiple gateways to enhance system performance. When multiple gateways are used, if a second application desires to export a transaction branch (push or pull) associated with the transaction (T1) to the second system, the transaction manager must check the global map to determine whether transaction T1 has been exported to the second system. If so, the transaction manager returns the local transaction identifier, here LT1, to the application and the application then communicates with the second system. Although this guarantees that the same transaction will never be exported twice to the same remote node, the process requires checking the global map in the transaction manager.

SUMMARY OF THE INVENTION

The present invention provides systems and methods for efficiently communicating with remote nodes by using a hashing function to access a distributed global map of transaction identifiers. In particular, the present invention provides techniques for supporting and maintaining a distributed global map of transaction identifiers at the gateway processes and using a hashing algorithm configured on each application process to access the global maps.

The techniques of the present invention allow for efficient communication with remote nodes using multiple gateway processes without the delay associated with checking a central global map of transaction identifiers at the transaction manager to determine the appropriate gateway process for exporting a transaction to a remote node. According to the invention, a portion of the global map of transaction identifiers is maintained at each gateway process. The global map at each gateway associates global transaction identifiers (such as T1 above) with local transaction identifiers (such as LT1). When an application process performing work for a particular transaction desires to export the particular transaction, a hashing function configured on the application process is applied to the global transaction identifier associated with the particular transaction. Application of the hashing function to the global transaction identifier identifies one of the gateway processes. The global transaction identifier is stored in the global map associated with that gateway process. When the remote transaction manager associated with the remote node responds with a local transaction identifier for a local transaction initiated at the remote node on behalf of the exported transaction, the local transaction identifier is stored to the identified gateway's global map in association with the global transaction identifier.

Each application process is configured with the same hashing function so that the same gateway process will always be identified given a particular global transaction identifier. Thus, if the same or another application process desires to export a transaction that has already been exported to a remote node, the hashing function on that application process identifies the same gateway. The identified gateway will check its global map and will see that the transaction has been previously exported. If the transaction has been previously exported to the same remote node to which the application process is now trying to export a transaction branch, the gateway will return the local transaction identifier associated with that remote node to the application process. In this manner, the same transaction will not be exported twice to the same remote node. If, on the other hand, it is determined that the transaction has not been exported to the desired remote node, the transaction will be exported to that node. When a local transaction identifier is received from the desired node, an entry will be made to the global map associating the transaction (i.e., the global transaction identifier) with that local transaction identifier.

According to one aspect of the invention, a method is provided for communicating with a remote node from a transaction processing system having a transaction manager, one or more application processes and two or more gateway processes for communicating with remote nodes. Each of the gateway processes has a global map that associates global transaction identifiers with local transaction identifiers and each of the one or more application processes is configured with the same hashing function. Application of the hashing function to a particular global transaction identifier always identifies the same gateway process. The method typically comprises the steps of performing work for a first transaction by a first application process, the first transaction having an associated global transaction identifier, and applying the hashing function to the global transaction identifier by the first application process so as to identify a first one of the gateway processes when the first application process desires to export the first transaction to a remote node. The method also typically includes the steps of exporting the first transaction to the remote node, and storing the global transaction identifier to the global map of the first gateway process.

According to another aspect of the invention, a transaction processing system is provided, which typically comprises a first transaction manager (TM) and two or more gateways associated with the TM for communicating with remote nodes. Each of the gateways has a global map that associates global transaction identifiers with local transaction identifiers. The system also typically comprises an application process that performs work for a first transaction, wherein the first transaction has an associated global transaction identifier. The application process is configured with a hashing function, wherein application of the hashing function to a particular global transaction identifier always identifies the same gateway. When the application process desires to export the first transaction to a remote node, the application process applies the hashing function to the global transaction identifier of the first transaction so as to identify a first one of the gateways. The first transaction is then exported to the remote node.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
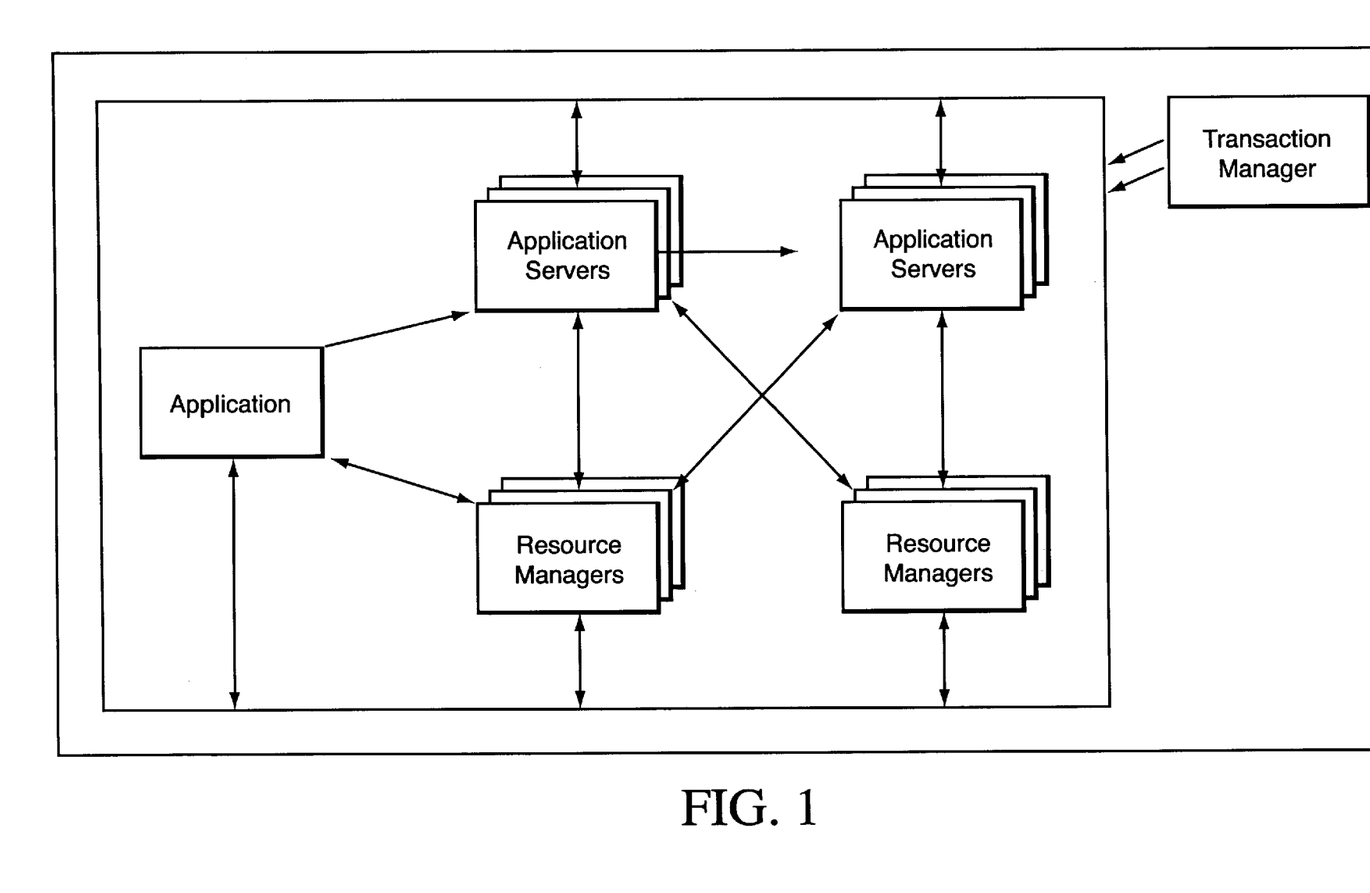
FIG. 1 is a block diagram that illustrates a typical call structure of an application invoking various resource managers and application services to execute a transaction that is spread among application programs (clients and servers) and resource managers.

FIG. 1 illustrates a typical call stricture of an application process that is invoking various resource managers and application services to execute a transaction that is spread among application programs (clients and servers) and resource managers according to the present invention. Transaction processing occurs in both centralized (local) systems and in distributed systems. The services and resource managers are invoked using local and/or remote procedure calls accordingly. Remote services and servers run in separate processes, such as on a remote computer system, while local services and servers run in the local computer system. In a localized transaction processing system, an application process accesses services by calling one or more local resource managers using a transactional procedure call. In a distributed transaction processing system, an application process accesses both local and remote services by calling one or more local resource managers, and/or one or more remote resource managers located at one or more remote processing nodes, or domains, using a transactional remote procedure call.

When an application process subcontracts part of a transaction to a foreign transaction management system it is commonly referred to as exporting a transaction branch. One or more transaction branches can be exported for a given transaction to one or more foreign transaction management systems. Similarly, a foreign transaction management system can start a transaction and subcontract part of the transaction to the local transaction management system. This is commonly referred to as importing a transaction branch.

Figure 2:
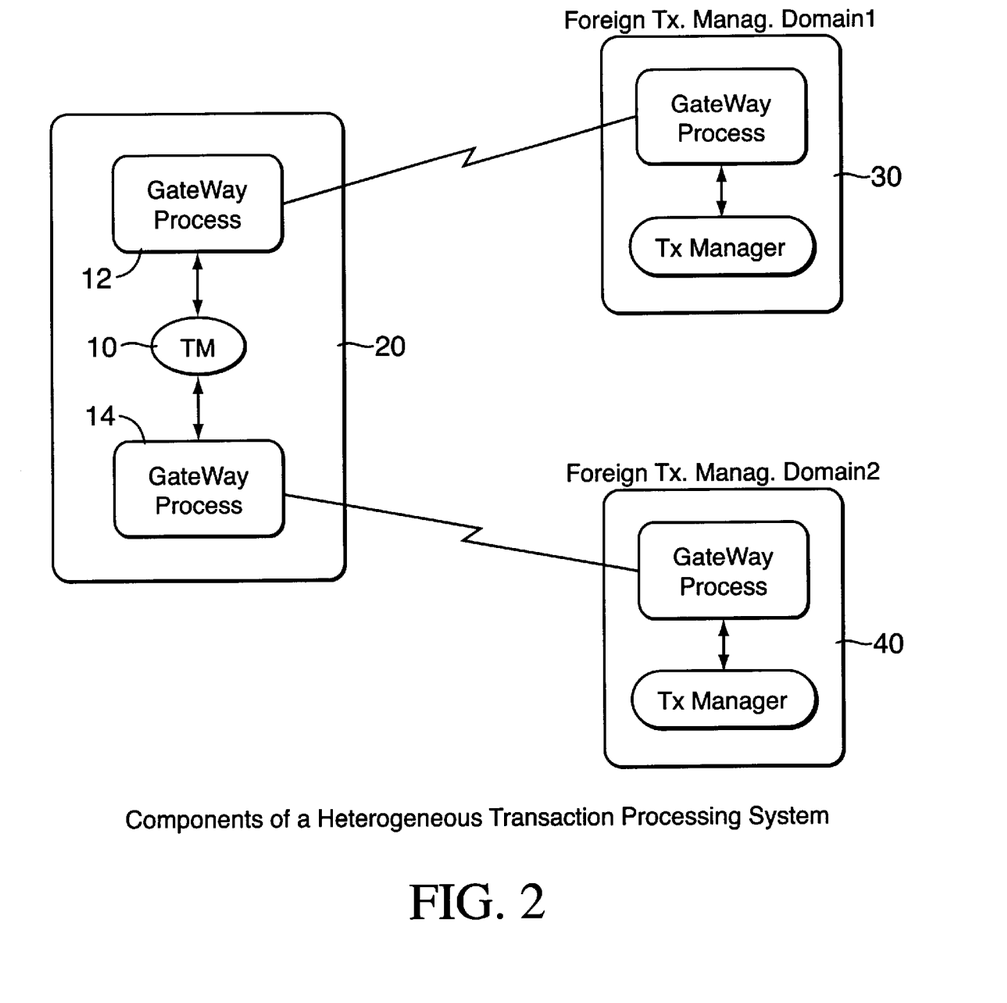
FIG. 2 is a block diagram that illustrates the basic components of a heterogeneous transaction processing system according to the present invention.

A typical transaction management system includes one or more applications, one or more resource managers including communication resource managers, and a transaction manager. The transaction manager provides transaction management functions, such as monitoring the progress of the transaction and coordinating the commitment processing (or agreement protocol) and rollback of the transaction, and protects the integrity of user data. An application process calls transaction services in the transaction manager to begin and end transactions. As part of a transaction, an application process accesses services by calling one or more local resource managers, and invokes remote services through one or more communication resource managers. A communication resource manager (CRM) encodes the transactional semantics of a foreign transaction management system and acts as a gateway to foreign transaction management domains. A CRM interfaces between the local transaction management system and a foreign transaction management domain. The process environment in which a CRM executes is called a gateway process, or simply "gateway". The gateway exports and imports transaction branches allowing foreign transaction managers to participate in the agreement protocol with the local transaction manager. FIG. 2 illustrates the basic components of such a heterogeneous transaction processing system according to the present invention. As shown, transaction manager 10 of local transaction management domain 20 imports and exports transactions to and from foreign transaction management domains 30 and 40 through gateway processes 12 and 14, respectively.

Figure 3A:
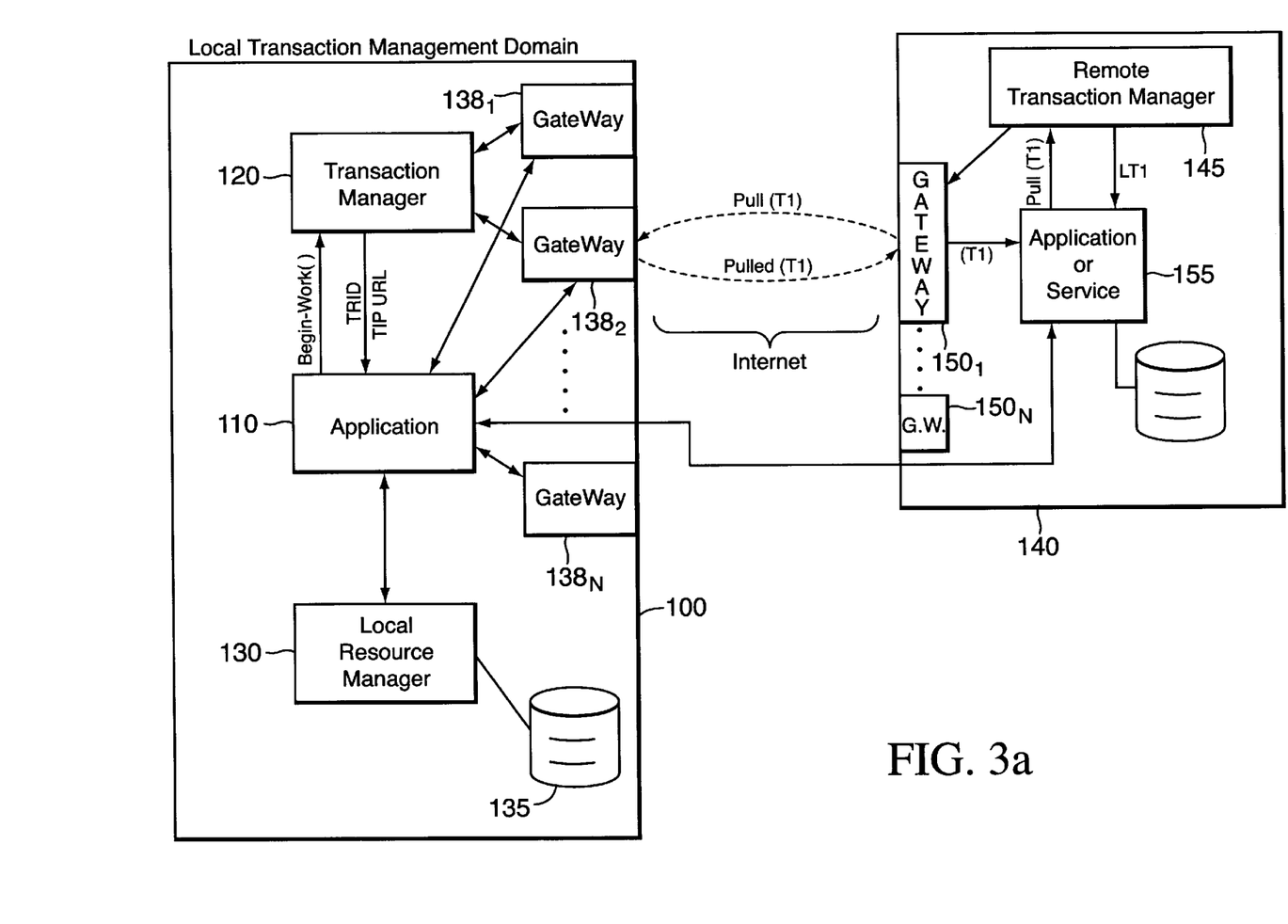
FIG. 3a is a block diagram that illustrates the basic control flow of an application executing a transaction using the "pull" model according to an embodiment of the present invention.
Figure 3B:
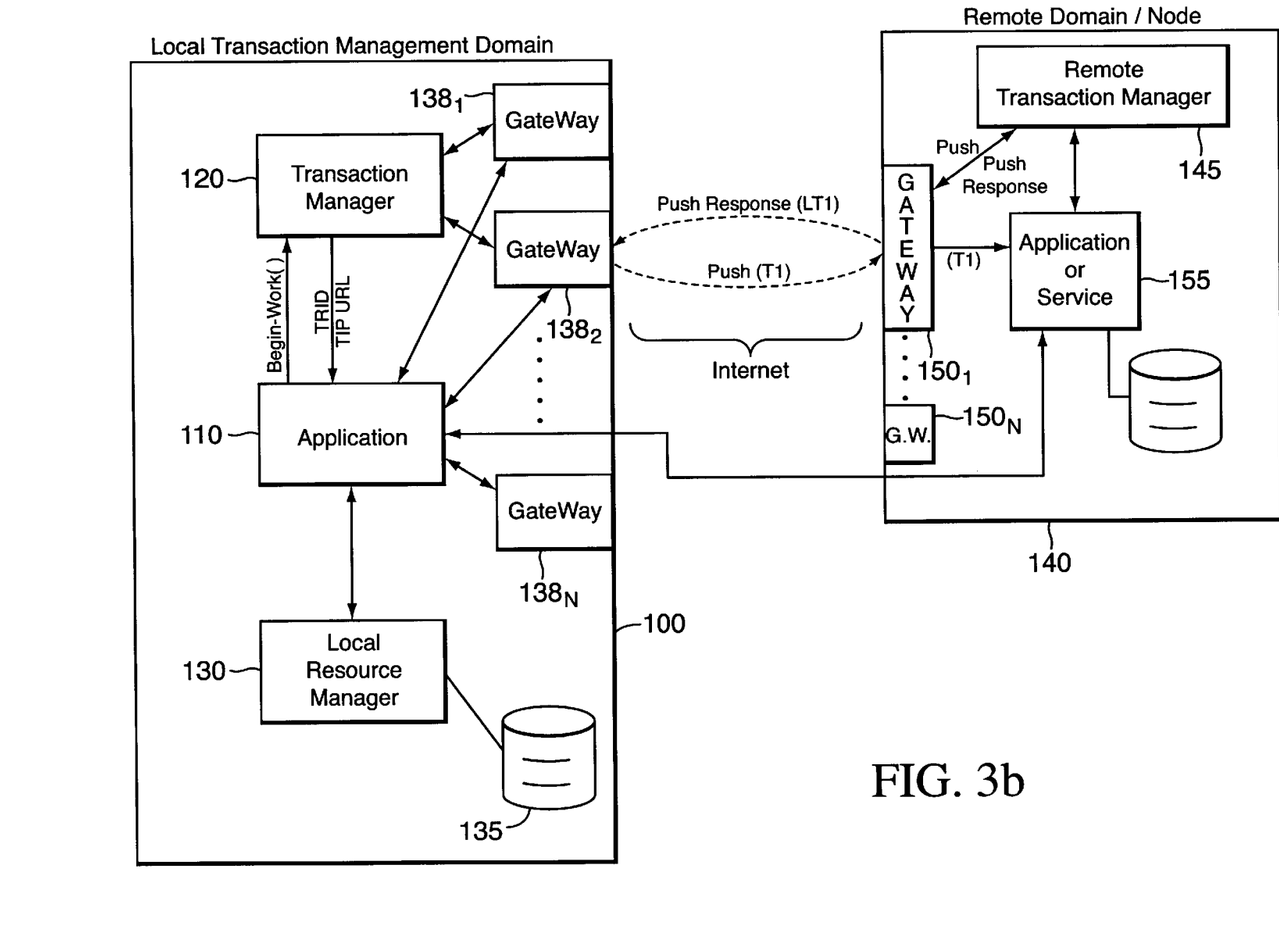
FIG. 3b is a block diagram that illustrates the basic control flow of an application executing a transaction using the "push" model according to an embodiment of the present invention.

FIGS. 3a and 3b illustrate the basic control flow of an application executing a transaction according to the pull and push models of TIP, respectively, according to an embodiment of the present invention. When application process 110 starts a transaction in (local) transaction management domain 100, it issues a Begin__Work() request to its associated transaction manager 120, thereby registering the transaction with transaction manager 120. Transaction manager 120 creates a unique transaction identifier (TRID), T1 for example, which is used to identify that particular transaction. Once application process 110 has started the transaction (the transaction has been registered with transaction manager 120), it invokes resource managers by sending work requests to remote (foreign) services and local services such as resource manager 130, which is coupled to a service or resource 135, such as a database.

As shown in FIG. 3a, in the case of the pull model, application process 110 requests from transaction manager 120 an identification of the transaction just initiated, including identification of the owner of that transaction (i.e., local transaction management domain 100) in the form of a TIP uniform resource locator (URL). In preferred aspects, the TIP URL includes a global transaction identifier, T1.

According to preferred aspects, application 110 is configured with a hashing algorithm, which when applied to global transaction identifier T1, identifies one of multiple gateways $138_1$–$138_n$ as will be discussed in more detail below. As shown in FIG. 3a, gateway $138_2$ is identified by the hashing function for the transaction identified by global transaction identifier T1.

Application 110 establishes an internet connection with remote transaction domain 140 and transfers a work request to remote resource manager 155. The work request includes the global transaction identifier, T1, of the transaction and its internet connection address (i.e., the TIP URL). At the same time application 110 may initiate work on its own system by issuing a work request to local resource manager 130. When the work request is received by remote resource manager 155, remote resource manager 155 retrieves the TIP URL and passes it with an appropriate call (i.e., pull call) to remote transaction manager 145. Remote transaction manager 145, in response, creates a local transaction identified by a local transaction identifier, LT1, under which work at the remote node will be tracked.

In one embodiment, remote transaction manager 145 instructs remote resource manager 155 to perform the requested work. Remote resource manager 155 is now operating in the context of local transaction LT1. Remote transaction manager 145 then sends a pull request to transaction manager 120. Transaction manager 120 responds to the pull request with a "Pull Response" to remote transaction manager 145 informing it that it has now been identified as a participant in the transaction T1. According to an alternate embodiment, remote transaction manager instructs remote resource manager 155 to perform work only after a pull response has been received from transaction manager 120.

In the pull case illustrated above, gateway $138_2$ associates the transaction LT1 started on the remote system with the transaction T1, by storing local transaction identifier LT1 to its global map (not shown) in association with global transaction identifier T1. It will also be apparent to one skilled in the art that remote node 140 can be configured with hashing functions, which when applied to a transaction identifier will identify one of gateways $150_1$ to $150_N$.

As shown in FIG. 3b, in the case of the push model, application process 110 exports a transaction branch to remote transaction processing system 140. Application 110 is designed to know that it must enlist the services of remote resource manager 155. Accordingly, application 110 requests from transaction manager 120 an identification of the transaction just initiated, such as T1.

According to preferred aspects, application 110 is configured with a hashing algorithm, which when applied to global transaction identifier T1, identifies one of multiple gateways $138_1$–$138_n$ as will be discussed in more detail below. As shown in FIG. 3b, gateway $138_2$ is identified by the hashing function.

Gateway $138_2$ establishes an internet connection with remote transaction domain 140 and transfers a push command to remote transaction manager 145 (via gateway 150 resident at remote node 140), requesting that the remote transaction manager 145 initiate a local transaction on behalf of transaction T1. The push command includes the global transaction identifier, T1, in the form of a TIP URL. At the same time application 110 may initiate work on its own system by issuing a work request to local resource manager 130. When the push command is received by remote transaction manager 145, remote transaction manager 145 retrieves the TIP URL from the push command. Remote transaction manager 145, in response, creates a local transaction identified by a local transaction identifier, LT1, under which work at the remote node will be tracked. Remote transaction manager 145 also creates a control block data structure where it stores information about transaction LT1, including its association with transaction T1.

Remote transaction manager 145 then sends a push response to transaction manager 120. The push response supplies the identification of the (subordinate) transaction started at the remote node on behalf of transaction T1 (i.e., LT1). Transaction manager 120 receives the push response and forwards the local transaction identifier LT1 to application 110. Application 110 then sends a work request to resource manager 155, including the identification of the transaction LT1 at that node for which the work is to be performed. Remote resource manager 155 is now operating in the context of local transaction LT1.

In the push case illustrated above, gateway $138_2$ associates the transaction LT1 started on the remote system with the transaction T1, by storing local transaction identifier LT1 to its global map (not shown) in association with global transaction identifier T1.

Figure 4:
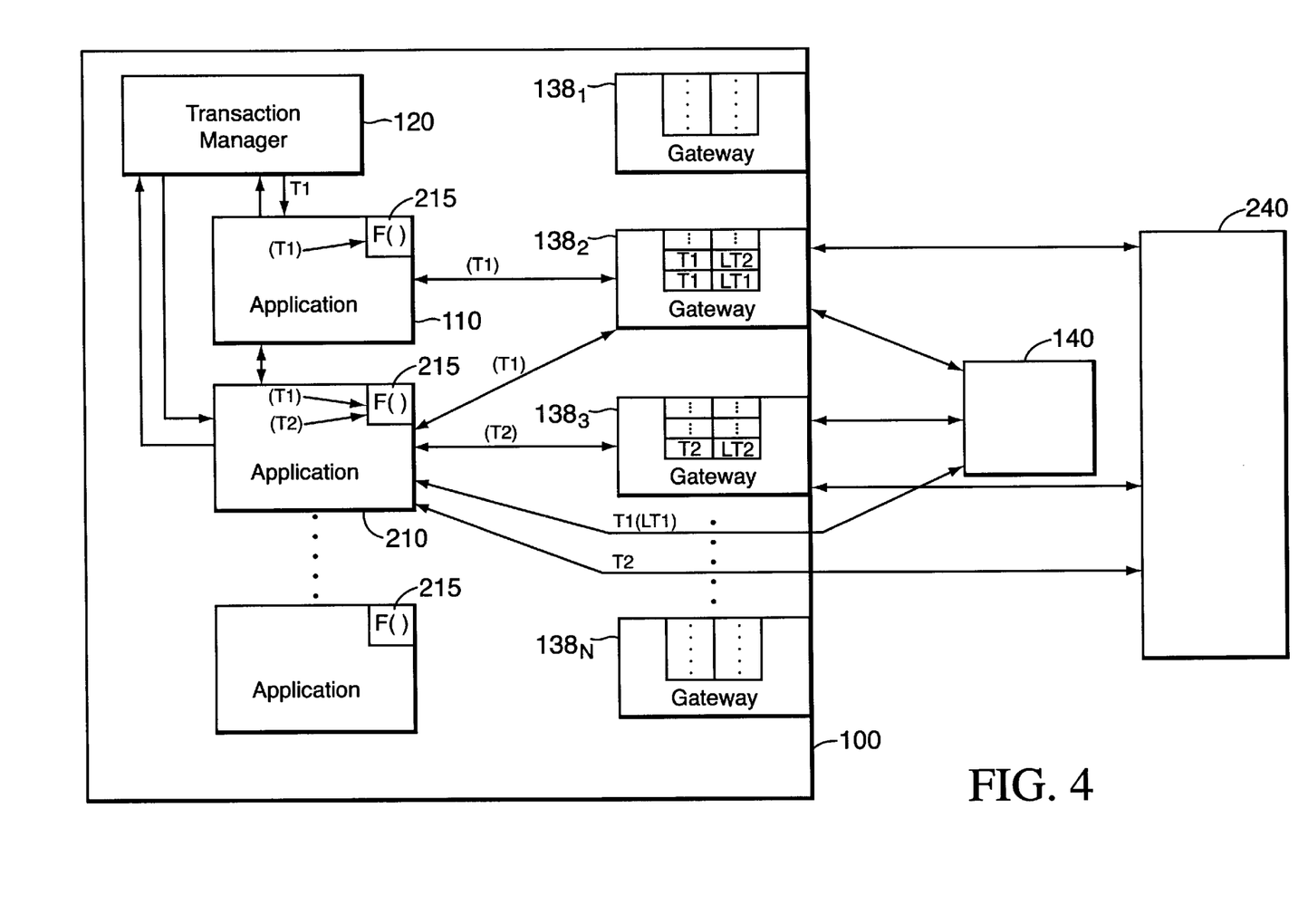
FIG. 4 is a block diagram that illustrates two application processes exporting, transactions to one or more remote nodes according to an embodiment of the present invention.

FIG. 4 is a block diagram showing two application processes exporting transactions to one or more remote nodes according to the present invention. First an example where a second application process 210 is also performing work on behalf of transaction T1 according to the present invention will be discussed. Second application 210, in this case, has received a request to perform work on behalf of transaction T1, which was originally initiated by application 110. The request to perform work on behalf of transaction T1 may have been received from within the local node 100, such as from application 110, or it may have been imported from a remote node, for example from remote node 140 requesting that work be done for transaction LT1 (whose global transaction identifier is T1).

In preferred aspects, second application 210 is configured with the same hashing function 215 as application 110. If second application 210 desires to send a work request to a remote node, application 210 calls hashing function 215 and applies it to the global transaction identifier of the transaction for which work is to be done, in this case T1. Application of the hashing function to global transaction identifier T1 identifies gateway $138_2$. Identified gateway $138_2$ will check its global map. If application 210 desires to send a work request to the same remote node 140, gateway $138_2$ will know that T1 has previously been exported to remote node 140, and will return the local transaction identifier LT1 to application 210. Application 210 will send the work request, including the local transaction identifier LT1 to remote node 140. If application 210 desires to send a work request to a different remote node 240, identified gateway will not return a local transaction identifier associated with remote node 240. Application 210 will send the work request (push or pull) to the desired remote node 240, and gateway $138_2$ will update its global map when a local transaction identifier, LT2, is received from remote note 240 as part of either a push response or a pull request. Gateway $138_2$ updates its global map by storing local transaction identifier LT2 in association with global transaction identifier T1.

Next an example where second application process 210 is performing work on behalf of a second transaction having a global transaction identifier T2 according to the present invention will be discussed. In this case, transaction T2 may have been initiated by application 210, or it may have been imported from a remote node. If second application 210 desires to send a work request to a remote node, application 210 calls its hashing function 215 and applies it to the global transaction identifier of the transaction for which work is to be done, in this case T2. Application of hashing function 215 to T2 identifies one of the gateways $138_1$–$138_N$ as will be discussed in more detail below. As shown in FIG. 4, gateway $138_3$ is identified when hashing function 215 is applied to T2. Identified gateway $138_3$ will check its global map and will see that transaction T2 has not been exported before. Application 210 will send its work request to the desired remote node (e.g., remote node 140 or 240), and gateway $138_3$ will update its global map when a local transaction identifier, LT2, is received from that remote node as part of either a push response or a pull request. Gateway $138_3$ updates its global map by storing local transaction identifier LT2 in association with global transaction identifier T2.

In preferred aspects, all application processes resident on node 100 are configured with the same hashing function 215. In this manner, whenever any of the application processes desire to export a specific transaction, e.g., T1 or T2, the hashing function 215 at each application process will always identify the same gateway for the same transaction. As described above, for example, application of the hashing function 215 to T1 will always identify gateway $138_2$ and application of the hashing function 215 to T2 will always identify gateway $138_3$, no matter which application process is exporting the transaction (and also, therefore, applying the hashing function). Because hashing of each transaction will always identify the same gateway (based on hashing of the transaction identifier), and because each gateway maintains its own map associating global transaction identifiers with local (remote) transaction identifiers, no transaction will be exported twice to the same remote node.

According to one embodiment of the present invention, the hashing function 215 takes the form:

$$\text{Remainder}\left(\frac{T \times ID}{N}\right) + 1 = \text{identified gateway,}$$

where TxID is the global transaction identifier (e.g., T1 or T2), and N is the number of gateways configured for the transaction management domain (e.g., domain 100). Typically, the number, N, of gateways for any transaction management domain will range from 2 to 16, but may be more. TxID can take on any numerical value as determined by the local transaction manager. As an example of the application of hashing function 215 to a global transaction identifier, reference is made to FIG. 4 and the associated discussion above. Assuming that T1 and T2 have the numerical values "125" and "126", respectively, and that 4 gateways are configured on transaction processing domain 100, application of hashing function 215 to T1 gives the result: Remainder(125/4)+1=1+1=gateway 2 ($138_2$). Likewise, application of hashing function 215 to T2 gives the result: Remainder(126/4)+1=2+1=gateway 3 ($138_3$). It will, of course, be clear to one skilled in the art that any function or algorithm, or group of functions or algorithms, that uniquely identifies one of the N gateways given a specific global transaction identifier (TxID) can also be used.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of communicating with a remote node from a transaction processing system having a transaction manager, one or more application processes and two or more gateway processes for communicating with remote nodes, the method comprising the steps of: wherein each of performing work for a first transaction by a first application process, the first transaction having an associated global transaction identifier, wherein each of the application processes, including the first application process, is configured with a hashing function, wherein application of the hashing function to a particular global transaction identifier always identifies the same gateway process, and wherein each of the gateway processes has a global map that associates global transaction identifiers with local transaction identifiers;

applying the hashing function to the global transaction identifier by the first application process so as to identify a first one of the gateway processes when the first application process desires to export the first transaction to a remote node;

exporting the first transaction to the remote node; and storing the global transaction identifier to the global map of the first gateway process.

2. The method of claim 1, further comprising the steps of:

receiving a local transaction identifier from the remote node, wherein the local identifier identifies a local transaction started at the remote node which is associated with the first transaction; and storing the local transaction identifier associated with the first transaction to the global map of the first gateway process.

3. The method of claim 2, wherein the remote node includes a transaction manager, and wherein the step of exporting the first transaction to the remote node includes the step of pushing the first transaction to the remote transaction manager, wherein the remote transaction manager initiates the local transaction.

4. The method of claim 2, wherein the remote node includes one of a resource manager and a second application process coupled to a transaction manager, and wherein the step of exporting the first transaction to the remote node includes the step of sending a work request to one of the remote resource manager and the second application process, wherein the remote transaction manager pulls the first transaction and initiates the local transaction.

5. The method of claim 1, wherein the global transaction identifier has a numerical value, and wherein the step of applying the hashing function to the global transaction identifier includes dividing the numerical value by the number of gateway processes.

6. The method of claim 1, wherein a second application process on the transaction processing system performs work on behalf of the first transaction, further including the step of applying the hashing function by the second application process to the global transaction identifier when the second application process desires to export the first transaction to a remote node, whereby the first gateway process is identified.

7. The method of claim 1, wherein a second application process on the transaction processing system performs work for a second transaction, the second transaction having an associated global transaction identifier, further including the steps of:

applying the hashing function by the second application process to the second global transaction identifier so as to identify one of the gateway processes when the second application process desires to export the second transaction to a remote node; and exporting the second transaction to the remote node.

8. The method of claim 7, wherein the identified gateway process is the first gateway process, the method further comprising the step of storing the second global transaction identifier to the global map associated with the first gateway process.

9. The method of claim 7, wherein the identified gateway process is a second one of the gateway processes the method further comprising the step of storing the second global transaction identifier to the global map associated with the second gateway process.

10. A transaction processing system comprising:

a first transaction manager (TM);

two or more gateways coupled to the TM for communicating with remote nodes, wherein each of the gateways has a global map that associates global transaction identifiers with local transaction identifiers;

an application process that performs work for a first transaction, the first transaction having an associated global transaction identifier, wherein said application process is configured with a hashing function, and wherein application of the hashing function to a particular global transaction identifier always identifies the same gateway, wherein when the application process desires to export the first transaction to a remote node, the application process applies the hashing function to the global transaction identifier of the first transaction so as to identify a first one of the gateways, and wherein the first transaction is exported to the remote node.

11. The system of claim 10, wherein the global transaction identifier of the first transaction is stored to the global map of the first gateway.

12. The system of claim 11, wherein the first gateway receives from the remote node a local transaction identifier that identifies a local transaction started at the remote node which is associated with the first transaction, and wherein the local transaction identifier associated with the first transaction is stored to the global map of the first gateway.

13. The system of claim 12, wherein the first transaction is exported to the remote node by pushing the first transaction to a remote transaction manager at the remote node, and wherein the remote transaction manager starts the local transaction.

14. The system of claim 12, wherein a work request is communicated to a remote resource and a second application process at the remote node, and wherein a remote transaction manager at the remote node pulls the first transaction and starts the local transaction.

15. The system of claim 10, further comprising a second application process that performs work on behalf of the first transaction, the second application process being configured with the hashing function, wherein when the second application process desires to export the first transaction to a remote node, the second application process applies the hashing function to the global transaction identifier of the first transaction, whereby the first gateway is identified.

16. The system of claim 10, further comprising a second application process that performs work on behalf of a second transaction, the second application process being configured with the hashing function, wherein the second transaction has an associated global transaction identifier, wherein when the second application process desires to export the second transaction to a remote node, the second application process applies the hashing function to the global transaction identifier of the second transaction so as to identify one of the gateways.

17. The system of claim 16, wherein the identified gateway is the first gateway, and wherein the global transaction identifier of the second transaction is stored to the global map of the first gateway.

18. The system of claim 16, wherein the identified gateway is a second one of the gateways, and wherein the global transaction identifier of the second transaction is stored to the global map of the second gateway.

19. A method of communicating with a remote node from a transaction processing system having a transaction manager, one or more application processes and two or more gateway processes for communicating with remote nodes, the method comprising the steps of:

performing work for a first transaction by a first application process, the first transaction having an associated global transaction identifier and the first application process being configured with a hashing function which maps a global transaction identifier to a gateway process;

applying the hashing function to the global transaction identifier by the first application process so as to identify a first one of the gateway processes when the first application process attempts to export the first transaction to a remote node, each of the gateway processes having a global map that associates global transaction identifiers with local transaction identifiers;

causing the identified gateway process to check its global map to determine whether there is a local transaction identifier, for a transaction at the remote node, associated with the global transaction identifier or the first transmission; and if not, exporting the first transmission to the remote node via the identified gateway process.

20. The method of claim 19, further comprising the steps of:

after exporting the first transaction, receiving a local transaction identifier from the remote node, wherein the local identifier identifies a local transaction started at the remote node which is associated with the first transaction; and storing the local transaction identifier associated with the first transaction to the global map of the first gateway process.

21. The method of claim 20, wherein the remote node includes a transaction manager, and wherein the step of exporting the first transaction to the remote node includes the steps of pushing the first transaction to the remote transaction manager, wherein the remote transaction manager initiates the local transaction.

22. The method of claim 20, wherein the remote node includes one of a resource manager and a second application process coupled to a transaction manager, and wherein the step of exporting the first transaction to the remote node includes the step of sending a work request to one of the remote resource manager and the second application process, wherein the remote transaction manager pulls the first transaction and initiates the local transaction.

23. The method of claim 19, wherein the global transmission identifier has a numerical value, and wherein the step of applying the hashing function to the global transaction identifier includes:
dividing the numerical value of the global transaction identifier by the number of gateway processes to generate a quotient and a remainder; and
identifying the gateway process based on the remainder.

24. The method of claim 19, wherein a second application process on the transaction processing system performs work on behalf of the first transaction; and further including the step of applying the hashing function by the second application process to the global transaction identifier when the second application process attempts to export the first transaction to a remote node, whereby the first gateway process is identified.

25. The method of claim 19, wherein a second application process on the transaction processing system performs work for a second transaction, the second transaction having an associated global transaction identifier; and further including the steps of:
applying the hashing function by the second application process to the second global transaction identifier so as to identify one of the gateway processes when the second application process attempts to export the second transaction to a remote node;

causing the identified gateway process to check its global map to determine whether there is a local transaction identifier, for a transaction at the remote node, associated with the second global transaction identifier of the second transaction; and if not, exporting the second transaction to the remote node.

26. The method of claim 25, wherein the identified gateway process is the first gateway process; and the method further comprising the step of, after exporting the second transaction, storing the second global transaction identifier to the global map associated with the first gateway process.

27. The method of claim 25, wherein the identified gateway process is a second one of the gateway processes; and the method further comprising the step of, after exporting the second transaction, storing the second global transaction identifier to the global map associated with the second gateway process.

28. A transaction processing system comprising:

a processing unit that includes a central processor and a program memory; the program memory having residing therein:

a first transaction manager (TM);

two or more gateway processes coupled to the TM for communicating with remote nodes, wherein each of the gateways has a global map that associates global transaction identifiers with local transaction identifiers; and an application process that performs work for a first transaction, the first transaction having an associated global transaction identifier, said application process being configured with a hashing function, which maps a global transaction identifier to a gateway process, said application process being configured to apply the hashing function to the global transaction identifier of the first transaction so as to identify a first one of the gateways, when the application process attempts to exports the first transaction to a remote node, and said application process being configured to cause the identified gateway process to check its global map to determine whether there is a local transaction identifier, for a transaction at the remote node, associated with the global transaction identifier of the first transaction, and to export the first transaction to the remote node, if there is no local transaction identifier associated with the global transaction identifier of the first transaction.

29. The system of claim 28, wherein the global transaction identifier of the first transaction is stored to the global map of the first gateway.

30. The system of claim 29, wherein, after the first transaction is exported, the first gateway receives from the remote node a local transmission identifier that identifies a local transaction stated at the remote node which is associated with the first transaction, and wherein the local transaction identifier associated with the first transaction is stored to the global map of the first gateway.

31. The system of claim 30, wherein the first transaction is exported to the remote node by pushing the first transaction to a remote transaction manager at the remote node, and wherein the remote transaction manager starts the local transaction.

32. The system of claim 30, wherein a work request is communicated to a remote resource and a second application process at the remote node, and wherein a remote transaction manager at the remote node pulls the first transaction and starts the local transaction.

33. The system of claim 28, further comprising a second application process that performs work on behalf of the first transaction, the second application process being configured with the hashing function, where, when the second application process attempts to export the first transaction to a remote node, the second application process applies the hashing function to the global transaction identifier of the first transaction, whereby the first gateway is identified.

34. The system of claim 28, further comprising a second application process that performs work on behalf of the second transaction, the second application process being configured with the hashing function, wherein the second transaction has an associated global transaction identifier, wherein, when the second application process attempts to export the second transaction to a remote node, the second application process applies the hashing function to the global transaction identifier of the second transaction so as to identify one of the gateways.

35. The system of claim 34, wherein the identified gateway is the first gateway, and wherein the global transaction identifier of the second transaction is stored to the global map of the first gateway.

36. The system of claim 34, wherein the identified gateway is a second one of the gateways, and wherein the global transaction identifier of the second transaction is stored to the global map of the second gateway.

37. The method of claim 23, wherein the step of identifying the gateway process includes adding one to the remainder and using the sum to identify the gateway process.

* * * * *